(12) United States Patent
Desjardins

(10) Patent No.: US 11,598,407 B1
(45) Date of Patent: Mar. 7, 2023

(54) EPICYCLIC GEAR TRAIN OF AIRCRAFT POWERPLANT

(71) Applicant: PRATT & WHITNEY CANADA CORP., Longueuil (CA)

(72) Inventor: Michel Desjardins, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/673,251

(22) Filed: Feb. 16, 2022

(51) Int. Cl.
| F16H 57/04 | (2010.01) |
| B64D 27/10 | (2006.01) |
| B64D 35/00 | (2006.01) |
| F16H 57/08 | (2006.01) |

(52) U.S. Cl.
CPC ......... *F16H 57/0421* (2013.01); *B64D 27/10* (2013.01); *B64D 35/00* (2013.01); *F16H 57/0486* (2013.01); *F16H 57/082* (2013.01)

(58) Field of Classification Search
CPC ............. F16H 57/0486; F16H 57/0421; F16H 57/082; B64D 27/10; B64D 35/00
See application file for complete search history.

(56) References Cited

U.S. PATENT DOCUMENTS

| 6,223,616 | B1 | 5/2001 | Sheridan |
| 6,663,530 | B2 | 12/2003 | Poulin et al. |
| 8,267,826 | B2 | 9/2012 | Duong et al. |
| 8,727,935 | B2* | 5/2014 | Coffin ..................... F02C 3/107 |
| | | | 475/346 |
| 8,777,793 | B2 | 7/2014 | Sheridan |
| 9,267,389 | B2 | 2/2016 | Pescosolido et al. |
| 9,759,309 | B2* | 9/2017 | Sheridan ............. F16H 57/0423 |
| 10,669,948 | B2* | 6/2020 | Sheridan ................. F02C 3/107 |
| 2008/0006018 | A1* | 1/2008 | Sheridan .................. F01D 25/18 |
| | | | 60/39.1 |
| 2010/0150702 | A1* | 6/2010 | Sheridan .................. F01D 25/18 |
| | | | 464/182 |
| 2012/0189430 | A1* | 7/2012 | McCune ................. F01D 25/18 |
| | | | 415/122.1 |
| 2013/0023378 | A1* | 1/2013 | McCune ............... F16H 57/023 |
| | | | 475/331 |
| 2014/0154054 | A1* | 6/2014 | Sheridan ............. F16H 57/0423 |
| | | | 415/122.1 |

(Continued)

FOREIGN PATENT DOCUMENTS

| EP | 1649191 B1 * | 11/2012 | ............. F02C 6/206 |
| EP | 2844855 B1 * | 8/2017 | ............. F01D 25/18 |

*Primary Examiner* — Juan G Flores
*Assistant Examiner* — Brian Christopher Delrue
(74) *Attorney, Agent, or Firm* — Norton Rose Fulbright Canada LLP

(57) ABSTRACT

An epicyclic gear train of an aircraft powerplant is provided. The epicyclic gear train includes a sun gear having a rotation axis, a ring gear, a plurality of intermediate gears circumscribed by the ring gear and being meshed with the sun gear and with the ring gear, a carrier supporting the intermediate gears, and a torque frame attaching the carrier to a stationary structure of the aircraft powerplant to prevent rotation of the carrier and of the intermediate gears about the rotation axis of the sun gear. The torque frame is attached to the carrier at a connection. The torque frame and the carrier cooperatively define a lubricant passage extending through the connection and supplying lubricant to at least one of the intermediate gears.

20 Claims, 10 Drawing Sheets

(56) References Cited

U.S. PATENT DOCUMENTS

2018/0230902 A1    8/2018  Desjardins
2019/0203648 A1*   7/2019  Sheridan ................. F01D 25/18
2020/0300340 A1*   9/2020  Desjardins ............... F16H 1/28
2022/0298974 A1*   9/2022  Desjardins .......... F16H 57/0431

* cited by examiner

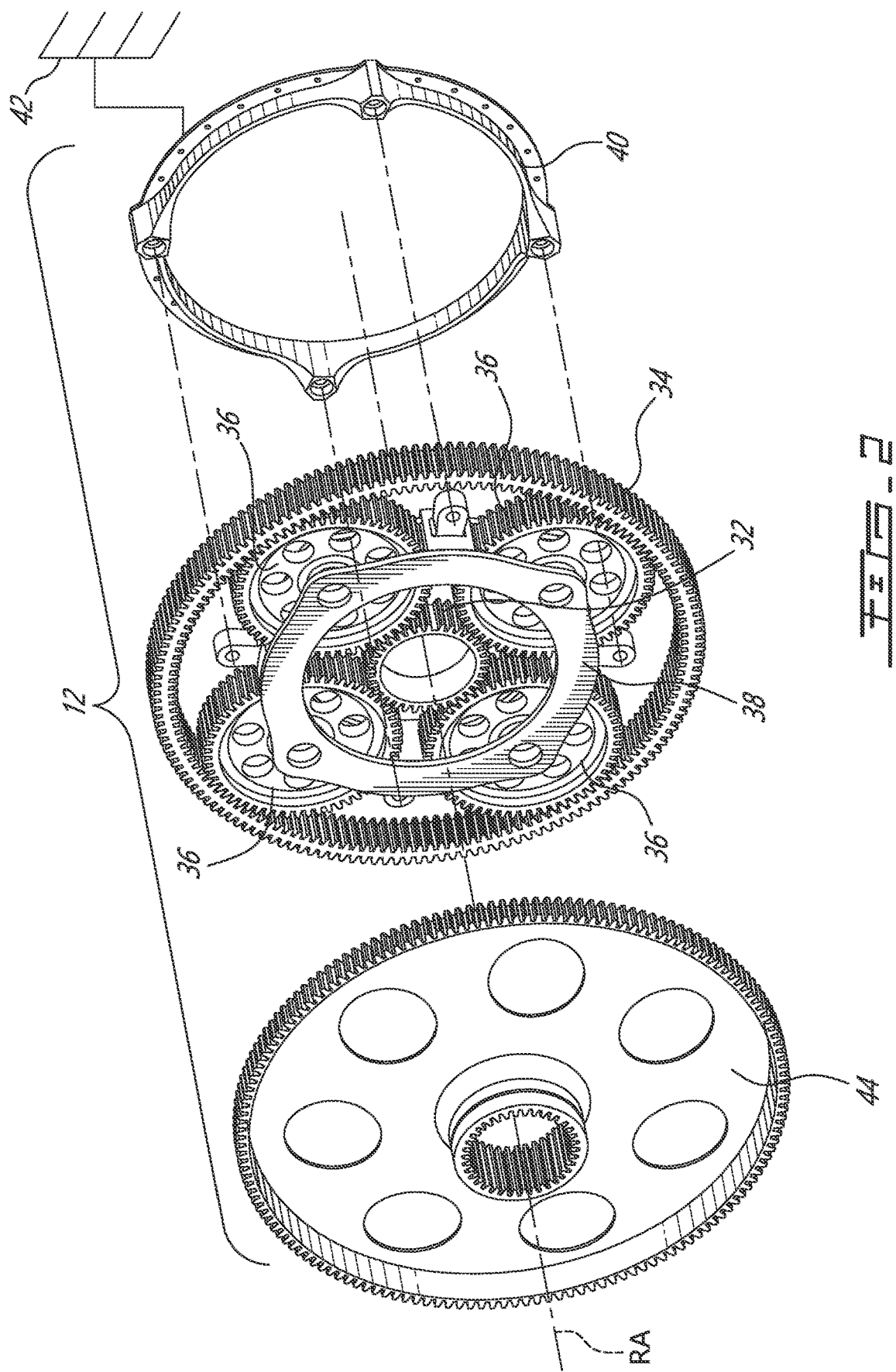

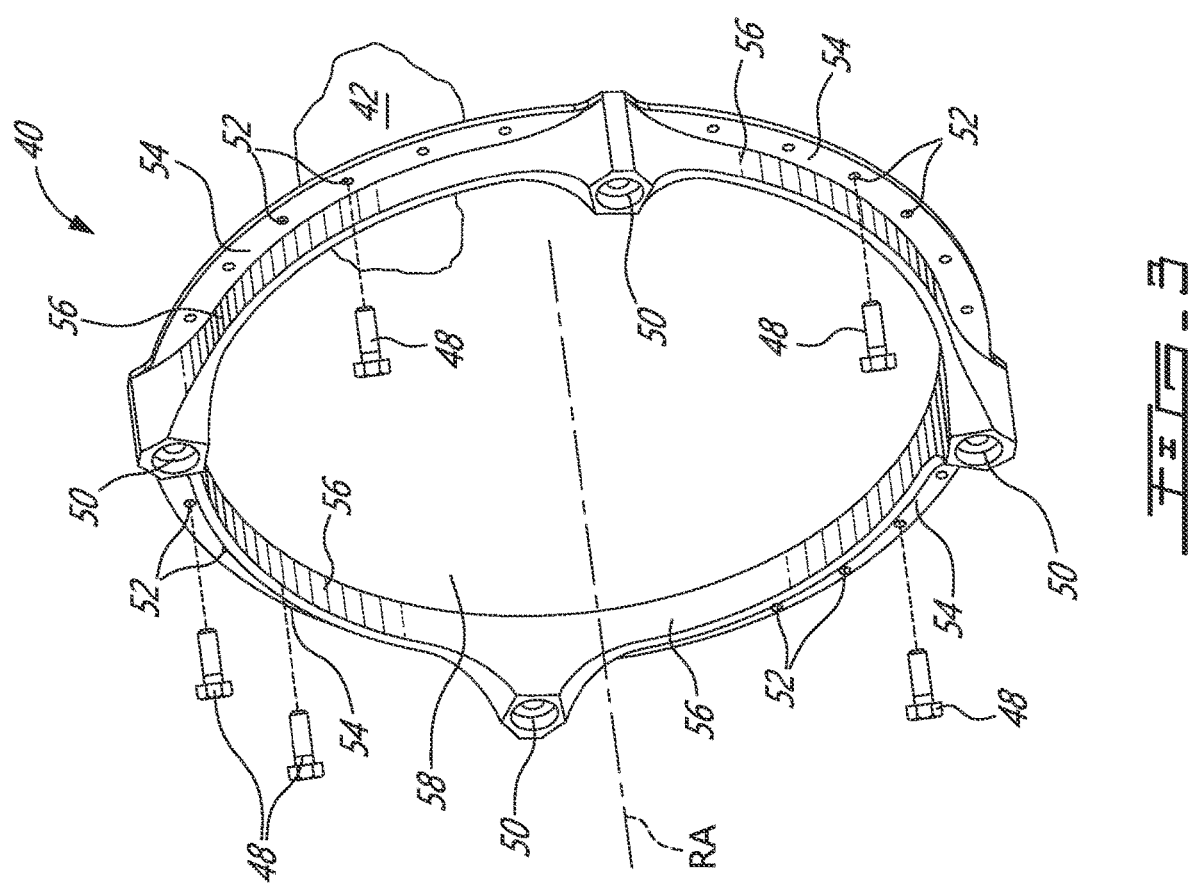

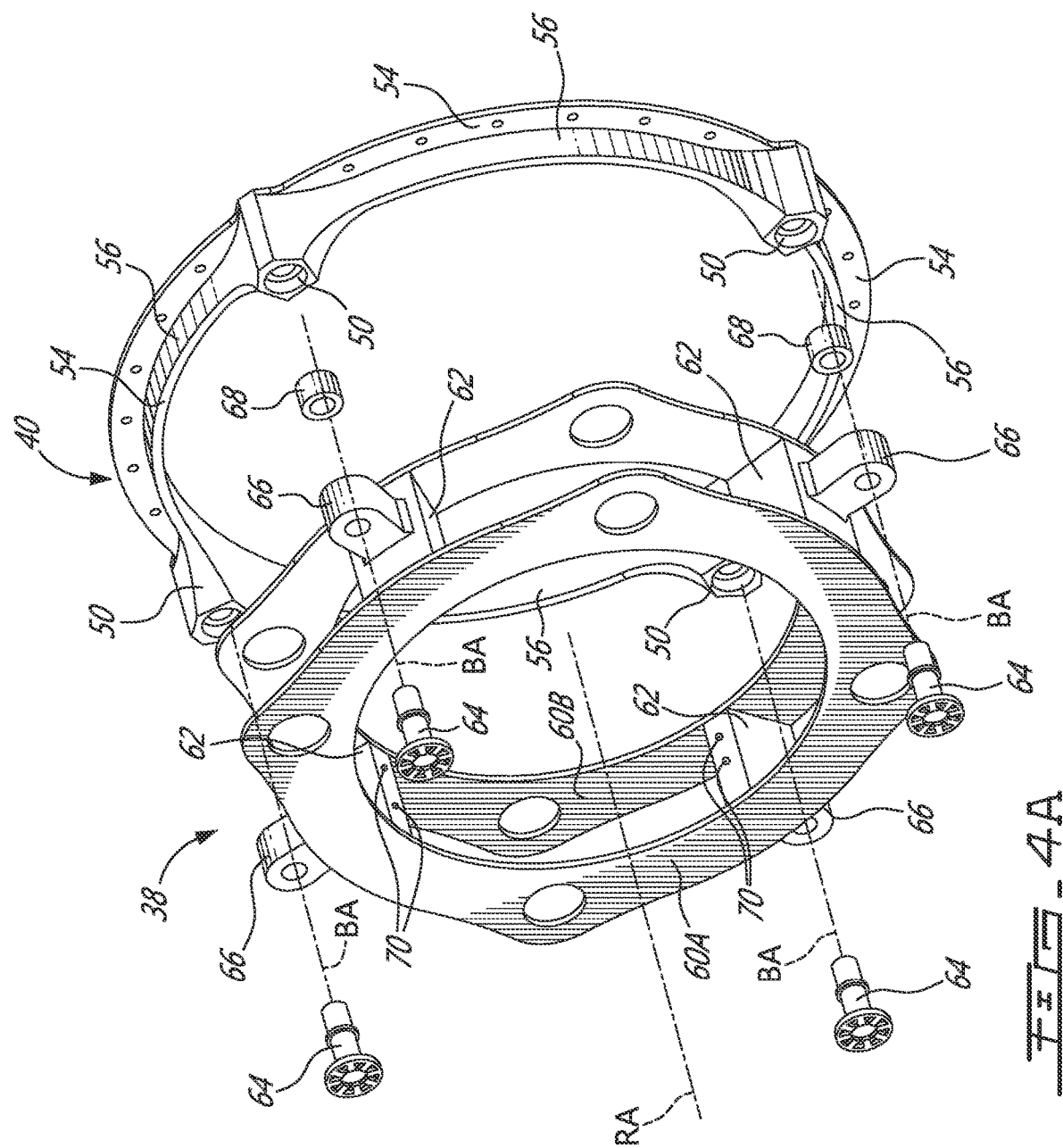

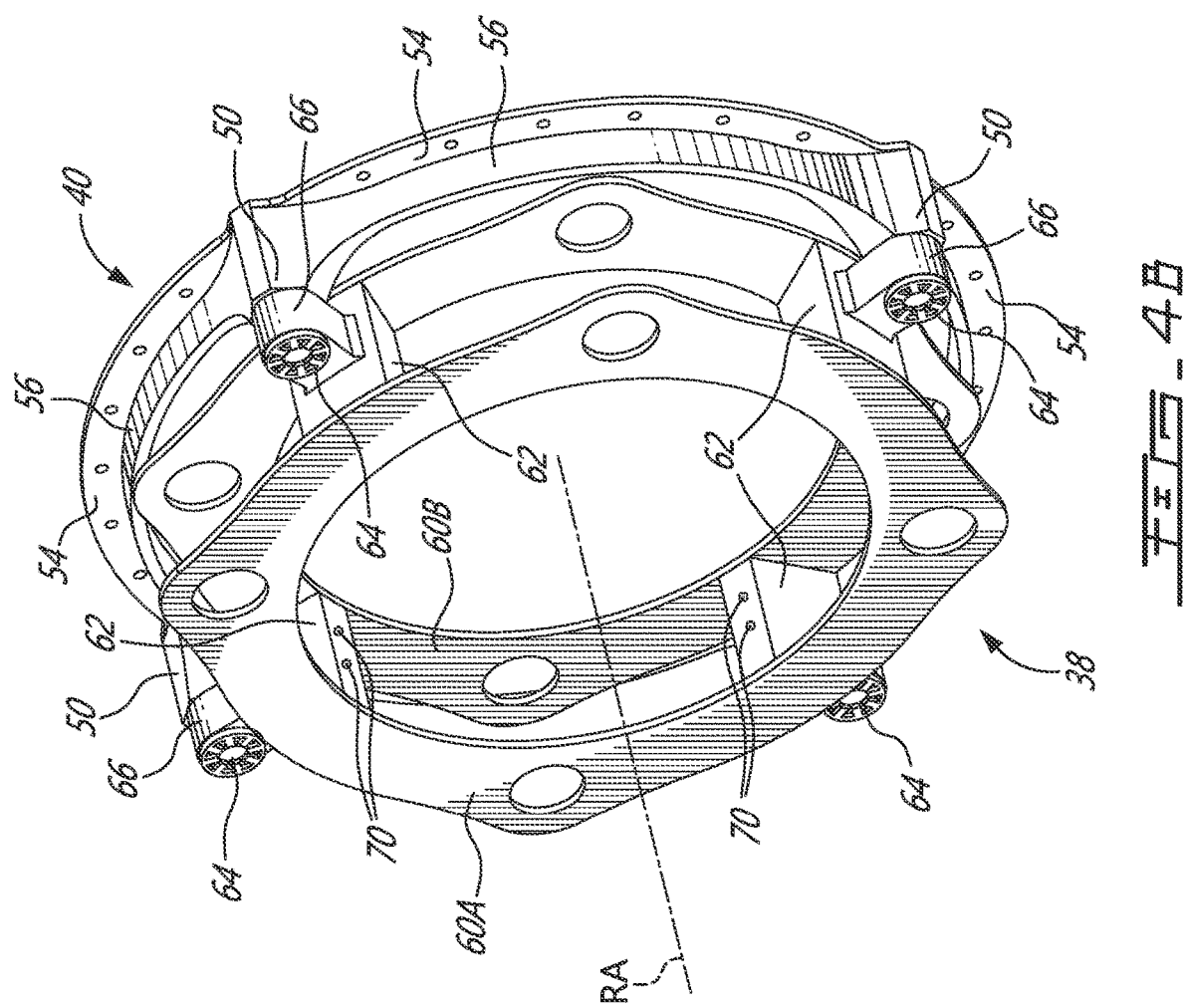

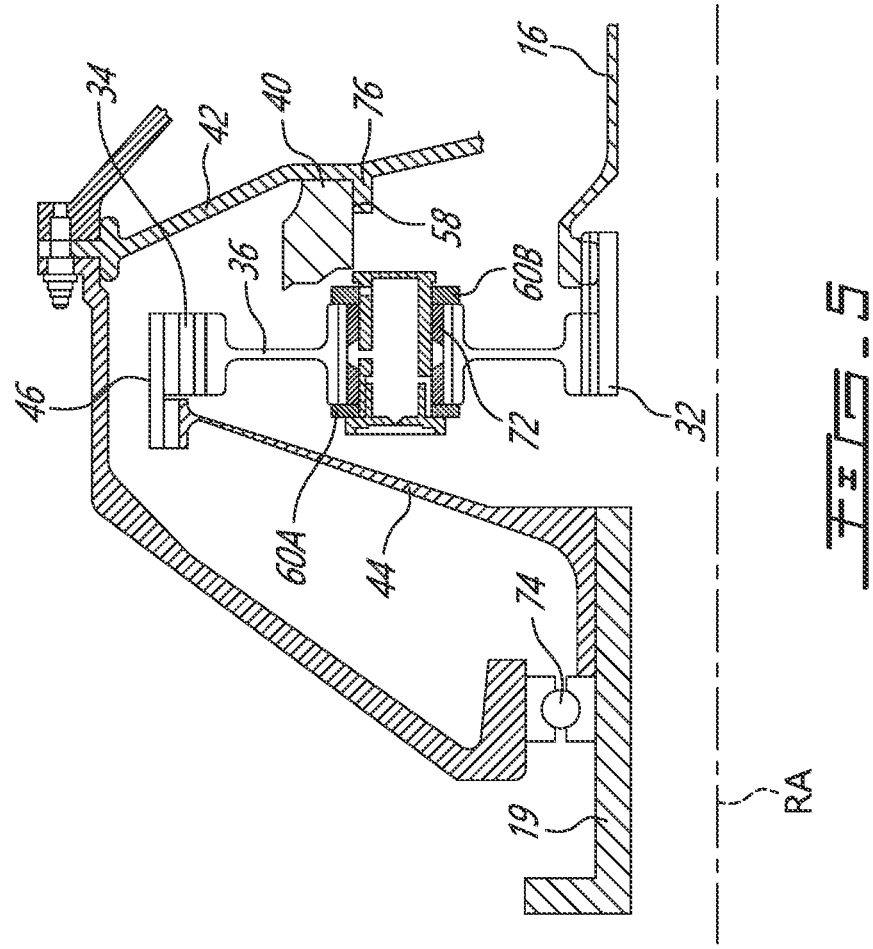

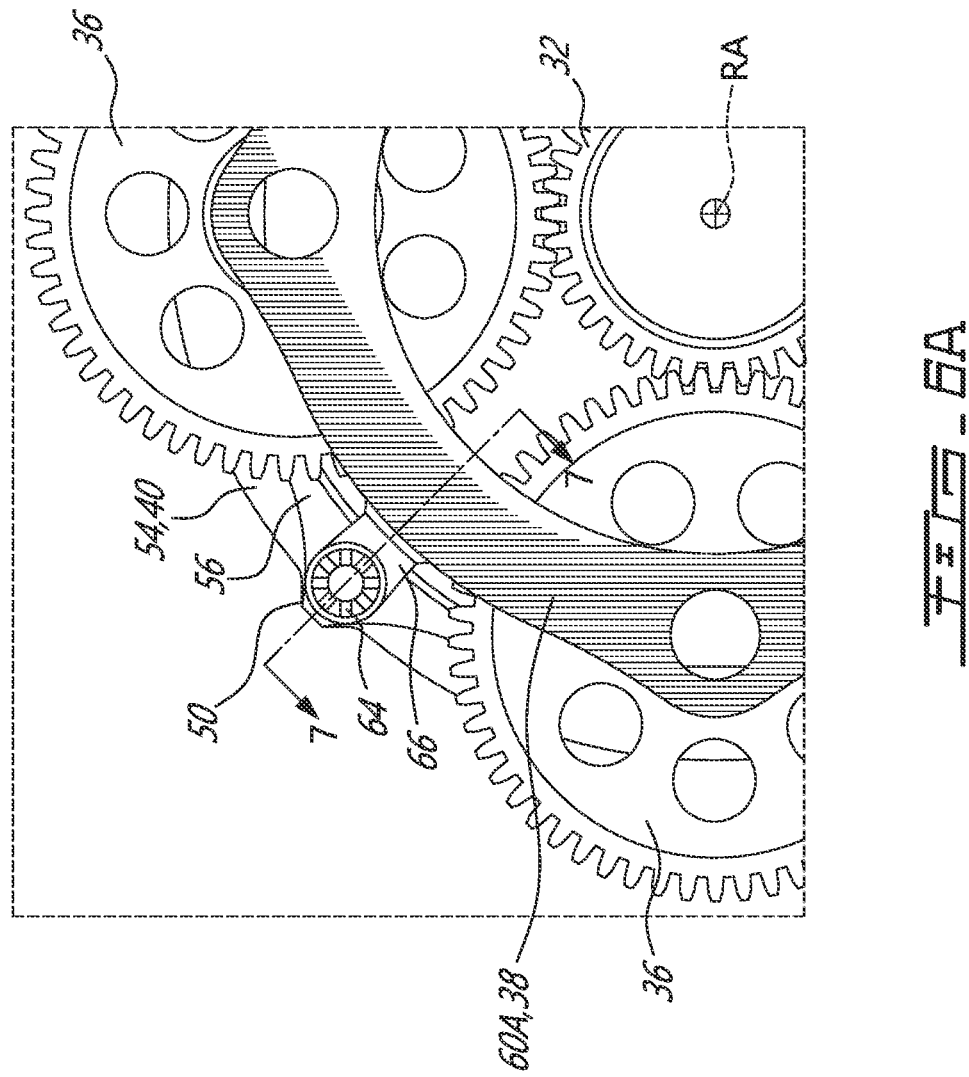

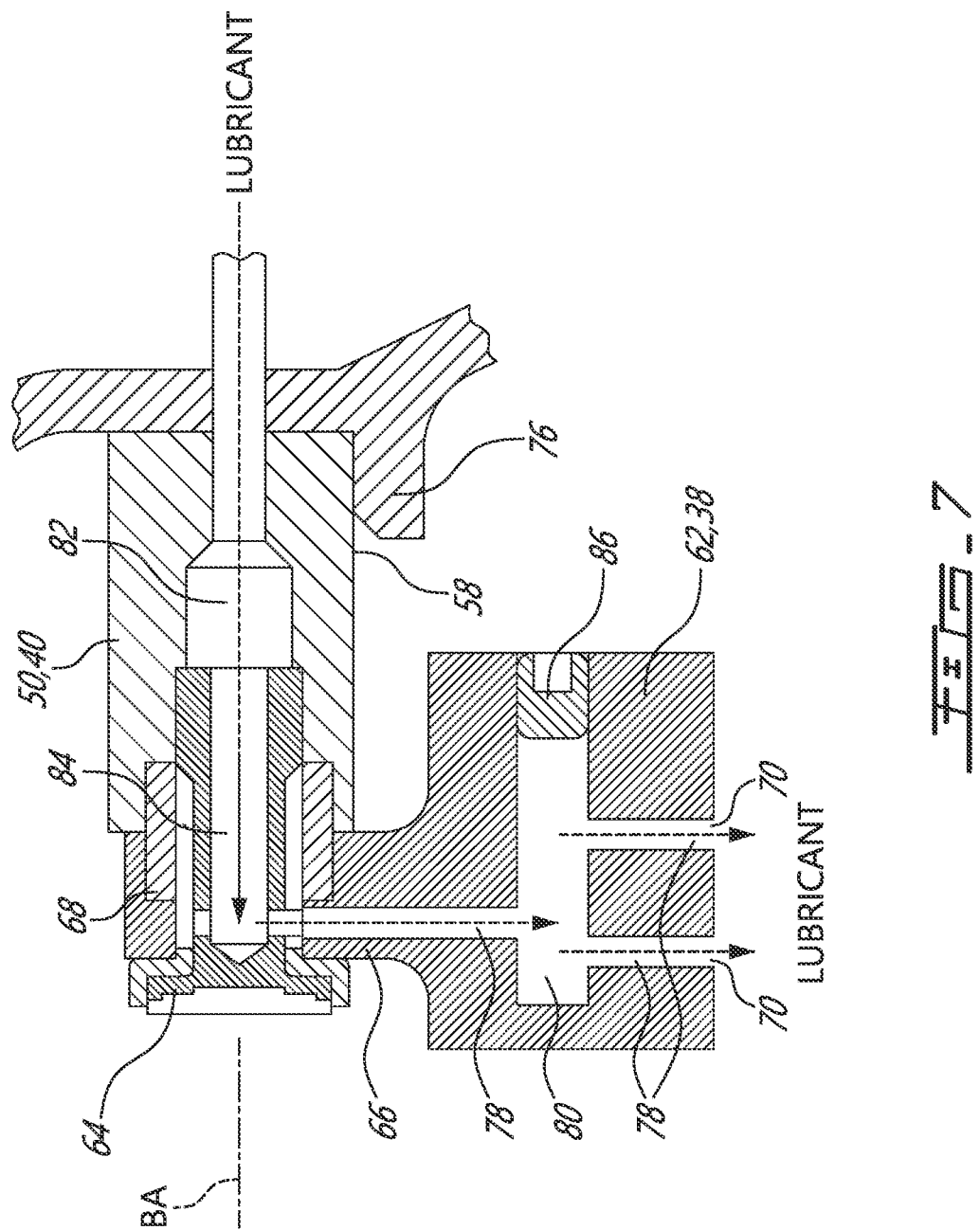

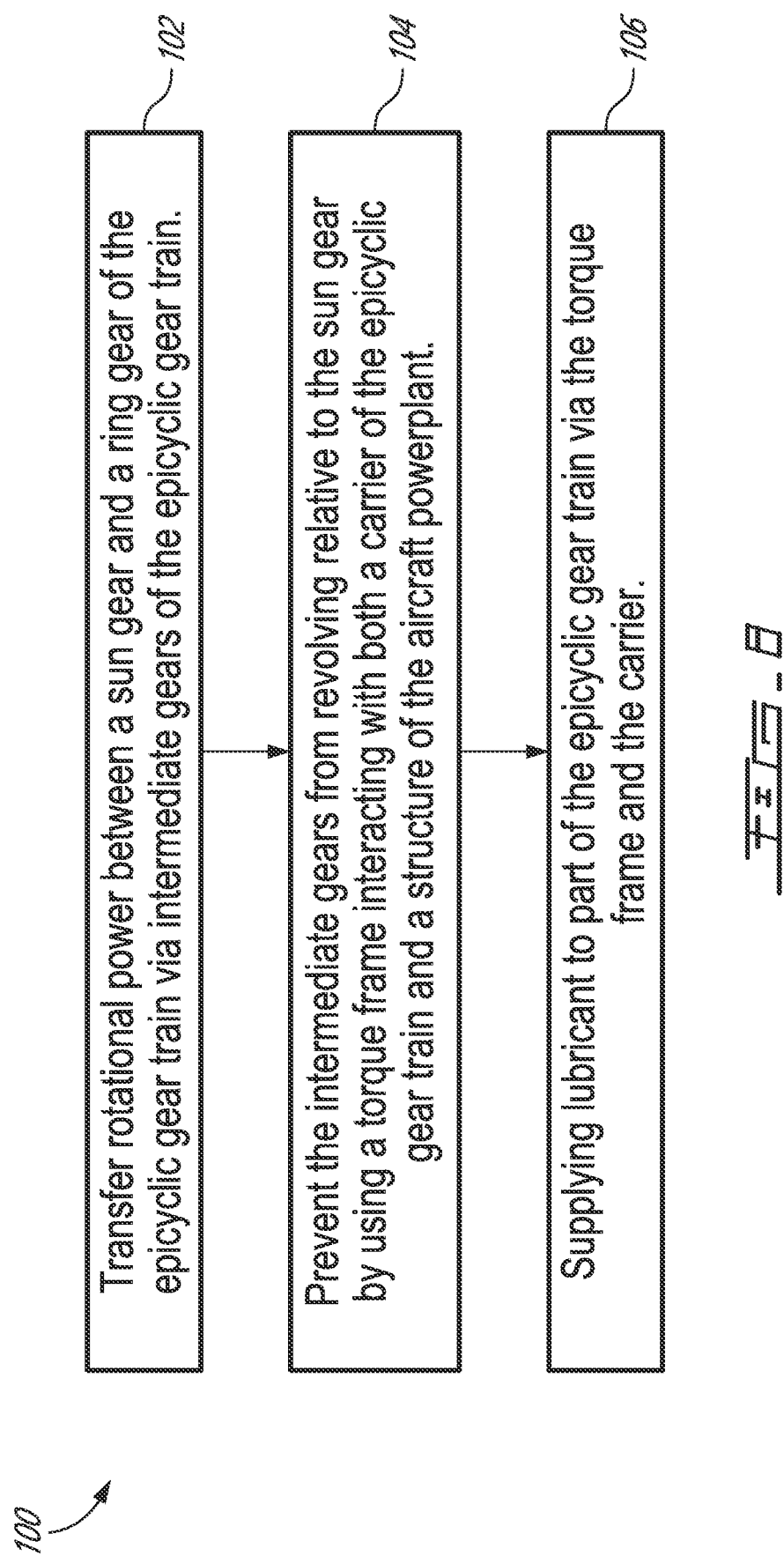

EPICYCLIC GEAR TRAIN OF AIRCRAFT POWERPLANT

TECHNICAL FIELD

The disclosure relates generally to aircraft powerplants, and more particularly to epicyclic gear trains used on aircraft powerplants.

BACKGROUND

A turboprop engine is an aircraft gas turbine engine that is coupled to a propeller via a reduction gearbox to reduce the rotational speed of the propeller relative to a turbine-driven shaft of the gas turbine engine. The gearbox contributes weight and complexity to the engine. Improvement is desirable.

SUMMARY

In one aspect, the disclosure describes a star-configured epicyclic gear train of an aircraft powerplant. The star-configured epicyclic gear train comprises:
 a sun gear having a rotation axis;
 a ring gear;
 a plurality of intermediate gears circumscribed by the ring gear, and being meshed with the sun gear and with the ring gear;
 a carrier supporting the intermediate gears; and
 a torque frame attaching the carrier to a stationary structure of the aircraft powerplant to prevent rotation of the carrier and of the intermediate gears about the rotation axis of the sun gear, the torque frame engaging the carrier at a connection, the torque frame and the carrier cooperatively defining a lubricant passage extending through the connection and extending to a lubricant outlet directed toward at least one of the intermediate gears.

In another aspect, the disclosure describes an aircraft powerplant comprising:
 a source of rotational power;
 a bladed rotor; and
 an epicyclic gear train drivingly coupling the source of rotational power to the bladed rotor, the epicyclic gear train including:
 an input gear for receiving the rotational power from the source of rotational power, the input gear having a rotation axis;
 an output gear drivingly coupled to the bladed rotor;
 an intermediate gear drivingly coupling the input gear to the output gear;
 a carrier supporting the intermediate gear; and
 a torque frame attaching the carrier to a structure of the aircraft powerplant to prevent rotation of the carrier and of the intermediate gear about the rotation axis of the input gear, the torque frame being attached to the carrier at a connection, the torque frame and the carrier cooperatively defining a lubricant passage extending through the connection for supplying lubricant to the epicyclic gear train.

In a further aspect, the disclosure describes a method of operating an epicyclic gear train associated with an aircraft powerplant. The method comprises:
 transferring rotational power between a sun gear and a ring gear of the epicyclic gear train via intermediate gears of the epicyclic gear train;
 preventing the intermediate gears from revolving relative to the sun gear by using a torque frame interacting with both a carrier of the epicyclic gear train and a structure of the aircraft powerplant; and
 supplying lubricant to part of the epicyclic gear train via the torque frame and the carrier.

Further details of these and other aspects of the subject matter of this application will be apparent from the detailed description included below and the drawings.

DESCRIPTION OF THE DRAWINGS

Reference is now made to the accompanying drawings, in which:

FIG. 2 is a partially disassembled perspective view of an exemplary epicyclic gear train of the engine of FIG. 1;

FIG. 3 is a perspective view of a torque frame of the epicyclic gear train of FIG. 2 with fasteners for attaching the torque frame to a stationary structure of the engine;

FIG. 4A is a perspective exploded view of a carrier and the torque frame of the epicyclic gear train of FIG. 2;

FIG. 4B is a perspective view of the carrier and the torque frame of FIG. 4A assembled together;

FIG. 5 is an upper portion of a schematic axial cross-section view of the epicyclic gear train of FIG. 2 when installed in the engine of FIG. 1;

FIG. 6A is a front view of part of the epicyclic gear train of FIG. 2;

FIG. 7 is a cross-section view of part of the carrier and the torque frame taken along line 7-7 in FIG. 6A; and FIG. 8 is a flow diagram of a method of operating an epicyllic gear train.

DETAILED DESCRIPTION

The following disclosure describes epicyclic gear trains and associated methods of operating epicyclic gear trains. In some embodiments, the gear trains described herein may be suitable for use in aircraft poweplant applications such as for drivingly coupling a propeller to a gas turbine engine in a turboprop installation for example. In some embodiments, an epicyclic gear train as described herein may promote structural efficiency while also integrating one or more lubricant distribution passages for supplying liquid lubricant (e.g., oil) to one or more components of the epicyclic gear train. In some embodiments, an epicyclic gear train as described herein may reduce the need for separate piping for delivering lubricant to components of the epicyclic gear train. Combining structural and lubrication functions within the support structure of the epicyclic gear train may also promote weight reduction and simplicity.

The terms "attached", "coupled" or "engaged" may include both direct attachment, coupling or engagement (in which two components contact each other) and indirect attachment, coupling or engagement (in which at least one additional component is located between the two components).

The term "substantially" as used herein may be applied to modify any quantitative representation which could permissibly vary without resulting in a change in the basic function to which it is related.

Aspects of various embodiments are described through reference to the drawings.

Figure 1:
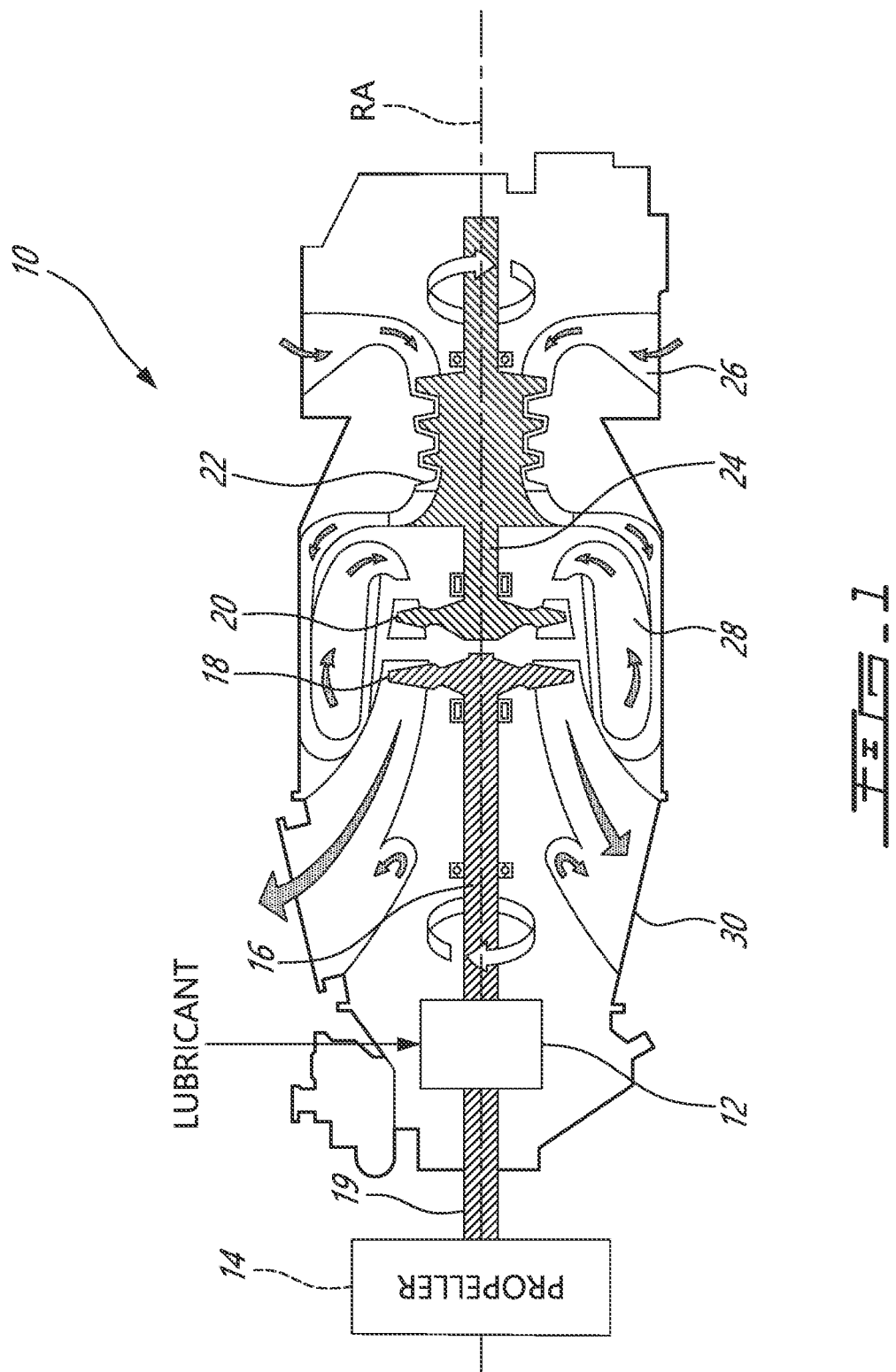
FIG. 1 is a schematic axial cross-section view of an exemplary reverse flow turboprop gas turbine engine including an epicyclic gear train as described herein.

FIG. 1 is a schematic axial cross-section view of an exemplary reverse flow turboprop gas turbine engine 10

(referred hereinafter as "engine 10") including an exemplary epicyclic gear train 12 (referred hereinafter as "gear train 12") as described herein. Even though the following description and accompanying drawings specifically refer to a turboprop gas turbine engine as an example, it is understood that aspects of the present disclosure may be equally applicable to other types of aircraft powerplants including gas turbine (e.g., continuous combustion) engines, internal (e.g., intermittent) combustion engines, electric aircraft powerplants and hybrid aircraft powerplants for example. Engine 10 may be of a type preferably provided for use in subsonic flight to drive a load such as propeller 14. Engine 10 may include low pressure (LP) shaft 16 (sometimes called "power shaft") coupled to and driven by LP turbine 18. Gear train 12 may receive rotational motive power from LP shaft 16 as an input and deliver rotational motive power to propeller 14 via propeller shaft 19. LP turbine 18 and LP shaft 16 may be part of a first spool of engine 10 known as a LP spool. Engine 10 may include a second or high pressure (HP) spool including (HP) turbine 20, (e.g., multistage) compressor 22 and HP shaft 24.

Compressor 22 may draw ambient air into engine 10 via inlet duct 26, increase the pressure of the drawn air and deliver the pressurized air to combustor 28 where the pressurized air is mixed with fuel and ignited for generating an annular stream of hot combustion gas. HP turbine 20 may extract energy from the hot expanding combustion gas and thereby drive compressor 22. The hot combustion gas leaving HP turbine 20 may be accelerated as it further expands, flow through and drive LP turbine 18. The combustion gas may then exit engine 10 via exhaust duct 30.

Gear train 12 may provide a speed-reducing function so that propeller shaft 19 and propeller 14 may rotate at a lower speed than LP shaft 16. In a turbofan engine for example, gear train 12 may provide a speed-reducing function between a turbine-driven shaft of the turbofan engine and a fan of the turbofan engine. In various embodiments, gear train 12 may be operatively disposed between a suitable source of motive power and a bladed rotor to provide a suitable speed-changing (e.g., reducing or increasing) function. In some embodiments, LP shaft 16 and propeller shaft 19 may be coaxial and rotate about rotation axis RA. In some embodiments, gear train 12 may provide a direction-changing function so that LP shaft 16 and propeller shaft 19 may rotate in opposite directions.

As explained further below, gear train 12 may be a lubrication load part of a lubrication circuit of engine 10. Gear train 12 may receive lubricant for lubricating and cooling gear teeth, bearings and/or other components of gear train 12. The lubricant may then be collected so that it can be reconditioned (cooled, filtered, de-aerated) and reused.

FIG. 2 is a partially disassembled view of an exemplary representation of gear train 12. Gear train 12 may include sun gear 32 rotatable about rotation axis RA, ring gear 34 rotatable about rotation axis RA, and one or more intermediate (e.g., planet) gears 36 circumscribed by ring gear 34. Intermediate gears 36 may be meshed with sun gear 32 and also with ring gear 34 in order to drivingly couple sun gear 32 with ring gear 34 for torque transfer therebetween. In other words, rotational motive power may be transferred between sun gear 32 and ring gear 34 via intermediate gears 36. Gear train 12 may also include carrier 38 supporting intermediate gears 36, and torque frame 40 attaching (i.e., grounding) carrier 38 to stationary structure 42 of engine 10 to prevent rotation of carrier 38 and of intermediate gears 36 about rotation axis RA of sun gear 32. In other words, intermediate gears 36 may be prevented from revolving relative to sun gear 32 via torque frame 40 interacting with both carrier 38 and stationary structure 42.

An epicyclic gear train can be configured as either a planetary system or a star system. In the embodiment shown in FIG. 2, gear train 12 may be an epicyclic gear train configured as a star system where carrier 38 is mechanically grounded. Rotational motive power from LP shaft 16 may be input to gear train 12 via sun gear 32. Rotational motive power may be output from gear train 12 via ring gear 34 being rotatable and drivingly coupled to propeller 14 via propeller shaft 19 and output coupler 44. Output coupler 44 may be drivingly coupled to propeller shaft 19 via a suitable splined connection. Propeller 14 may be attached (e.g., fastened, secured) to propeller shaft 19 in any suitable manner. Output coupler 44 may be drivingly coupled to ring gear 34 via ring gear coupler 46 (shown in FIG. 5) providing a splined connection permitting the transfer of rotational motive power from ring gear 34 to output coupler 44. During operation of gear train 12, ring gear 34, ring gear coupler 46, output coupler 44, propeller shaft 19 and propeller 14 may rotate together at the same speed about rotation axis RA.

Since carrier 38 is grounded (i.e., prevented from rotating) in a star system, intermediate gears 36 also cannot orbit sun gear 32 and may therefore be referred to as star gears instead of planet gears. In operation, LP shaft 16 may rotatably drive sun gear 32, compelling intermediate gears 36 to rotate about their own respective axes. The rotary motion of intermediate gears 36 causes ring gear 34 and hence propeller shaft 19 to rotate in a direction opposite to that of LP shaft 16.

FIG. 3 is a perspective view of the torque frame 40 with some exemplary fasteners 48 for attaching torque frame 40 to (e.g., stationary) structure 42 of engine 10. Torque frame 40 may include one or more sockets 50 that may be used to establish one or more structural and lubricant connections between torque frame 40 and carrier 38 as explained below. Torque frame 40 may be attached to stationary structure 42 using one or more fasteners 48 and/or pins extending through holes 52 formed in flanges 54. Fasteners 48 may include bolts that are threaded into threaded holes formed in stationary structure 42 for example. Fasteners 48 may transfer shear loads (due to torque) and axial loads between torque frame 40 and stationary structure 42. For clarity, some fasteners 48 have been omitted from FIG. 3. The attachment of torque frame 40 to carrier 38 and to stationary structure 42 may prevent rotation of carrier 38 and of intermediate gears 36 about rotation axis RA of sun gear 32.

Torque frame 40 may include flanges 54 extending between neighbouring sockets 50. Alternatively, a single flange 54 may extend completely around rotation axis RA. Flange(s) 54 may extend at least partially around rotation axis RA and may provide an interface for attaching torque frame 40 to stationary structure 42. The position(s) of flanges 54 and consequently of fasteners 48 in relation to the overall gear train 12 may be radially inward of ring gear 34 relative to rotation axis RA as shown in FIG. 2.

Torque frame 40 may include one or more stiffening ribs 56 providing structural stiffness to torque frame 40. Ribs 56 may extend axially from flanges 54. Ribs 56 may structurally interconnect sockets 50 with adjacent flanges 54. Accordingly, ribs 56 may each extend at least partially around rotation axis RA. In some embodiments, ribs 56 may have a radial thickness that varies along the angular direction relative to rotation axis RA to provide the required stiffness in a structurally efficient and low-weight manner. For example, ribs 56 may be radially thicker and provide more stiffness at angular positions adjacent sockets 50. Ribs 56 may be radially thinner at angular positions that are distal of sockets 50. In some embodiments, flanges 54 may extend radially outward from respective ribs 56 in relation to rotation axis RA. Accordingly, fasteners 48 may also be disposed radially outward of ribs 56. Torque frame 40 may have an annular overall shape defining central bore 58 extending therethrough. Central bore 58 may be defined at least in part by a radially inner side of rib 56. Central bore 58 may have a substantially circular cross-sectional profile taken in a plane perpendicular to rotation axis RA. Central bore 58 may be coaxial with rotation axis RA. When installed in engine 10, central bore 58 may serve as a locating feature for positioning torque frame 40 relative to stationary structure 42 or other structure of engine 10, which may include shoulder 76 shown in FIG. 7.

FIG. 4A is a perspective exploded view of carrier 38 and torque frame 40 of gear train 12. Carrier 38 may include first carrier frame 60A disposed to a first axial side of the plurality of intermediate gears 36, second carrier frame 60B disposed to a second axial side of the plurality of intermediate gears 36 opposite the first axial side. First carrier frame 60A may rotatably support the first axial sides of the respective intermediate gears 36 via respective journal bearings (not shown), and the second carrier frame 60B may rotatably support the second axial sides of the respect intermediate gears 36 via the same or other journal bearings. Carrier 38 may include one or more arms 62 extending axially between and structurally interconnecting first carrier frame 60A and second carrier frame 60B together. For example, arms 62 may be welded to or have a unitary construction with first carrier frame 60A and second carrier frame 60B. In some embodiments, the configuration of carrier 38 may hinder twisting between first carrier frame 60A and second carrier frame 60B when gear train 12 is under load. In some embodiments, the configuration of carrier 38 may promote parallelism of the axles of intermediate gears 36 during operation of gear train 12.

Torque frame 40 and carrier 38 may be attached together at a plurality of connections angularly spaced apart about rotation axis RA. For example, one or more of the structural connections between torque frame 40 and carrier 38 may each be established by bolt 64 extending through bracket 66 of carrier 38 and being threaded into a threaded portion of socket 50 of torque frame 40. Alternatively or in addition, torque frame 40 and carrier 38 may be engaged together by way of pins, mating geometries or other fasteners. Brackets 66 may be attached to (e.g., welded to, or have a unitary construction with) respective arms 62 of carrier 38. Brackets 66 may extend radially outward from respective arms 62 and may each have a hole for receiving bolt 64 therethrough. Bolt 64 may also extend through sleeve 68, which may be inserted into socket 50 and transfer shear loads between bolt 64 and socket 50 during operation of gear train 12. Bolt 64 may be oriented to extend along bolt axis BA corresponding to a longitudinal direction of bolt 64. In some embodiments, bolt axis BA may be substantially parallel to rotation axis RA.

As explained further below, one or more (e.g., all) of the structural connections between torque frame 40 and carrier 38 may also define respective fluid connections permitting the supply of liquid lubricant to one or more components of gear train 12. The structural connections may provide both a structural interface and a liquid lubricant interface between torque frame 40 and carrier 38. The fluid connections may be part of a lubricant passage that is cooperatively defined by torque frame 40 and carrier 38. For example, torque frame 40 and carrier 38 may each include one or more internal lubricant passages. FIG. 4A shows lubricant outlets 70 (e.g., oil jets) defined in arms 62 of carrier 38 and which may be in fluid communication with lubricant passages defined in arms 62 and/or other part(s) of carrier 38. Lubricant outlets 70 may deliver lubricant to one or more components (e.g., gear teeth, bearings) of gear train 12 during operation of gear train 12 (see lubricant outlets 70 in FIG. 6B also).

FIG. 4B is a perspective view of carrier 38 and torque frame 40 of FIG. 4A assembled (e.g., attached, engaged) together at four (structural and fluid) connections using respective bolts 64.

FIG. 5 is an upper portion of a schematic axial cross-section view of gear train 12 installed in engine 10. Sun gear 32 may serve as the input gear to gear train 12 and may be drivingly coupled to LP shaft 16 via a splined coupling. Intermediate gear 36 may be meshed with both sun gear 32 and ring gear 34. Intermediate gear 36 may be rotatably supported by first carrier frame 60A and second carrier frame 60B via (e.g., journal) bearing 72. Ring gear coupler 46 may circumscribe both ring gear 34 and output coupler 44. Ring gear coupler 46 may be drivingly coupled to ring gear 34 via a splined connection, and also be drivingly coupled to ring gear 34 via a splined connection to permit the transfer of rotational motive power between ring gear 34 and output coupler 44. Output coupler 44 may be drivingly coupled to propeller shaft 19 via a splined connection. Propeller shaft 19 may be rotatably supported by bearing 74.

FIG. 5 shows part of torque frame 40 being engaged with and attached to stationary structure 42. Stationary structure 42 may be a gearbox housing in which gear train 12 may be disposed. The gearbox housing may be attached to a casing of engine 10. Bore 58 of torque frame 40 may be engaged with one or more shoulders 76 formed on stationary structure 42. The interfacing of bore 58 with shoulder(s) 76 may allow torque frame 40 to be properly located (e.g., centered) relative to stationary structure 42. In some embodiments, bore 58 and shoulder(s) 76 may define a spigot joint where shoulder(s) 76 is/are inserted inside of and is/are in contact with bore 58.

FIG. 6A is a front view of part of gear train 12 with ring gear 34 omitted for clarity. The connections between carrier 38 and torque frame 40 established with bolts 64 may have an angular position relative to rotation axis RA so that bolts 64 are located between neighboring intermediate gears 36. Brackets 66 and respective arms 62 may also be located between neighboring intermediate gears 36.

Figure 6B:
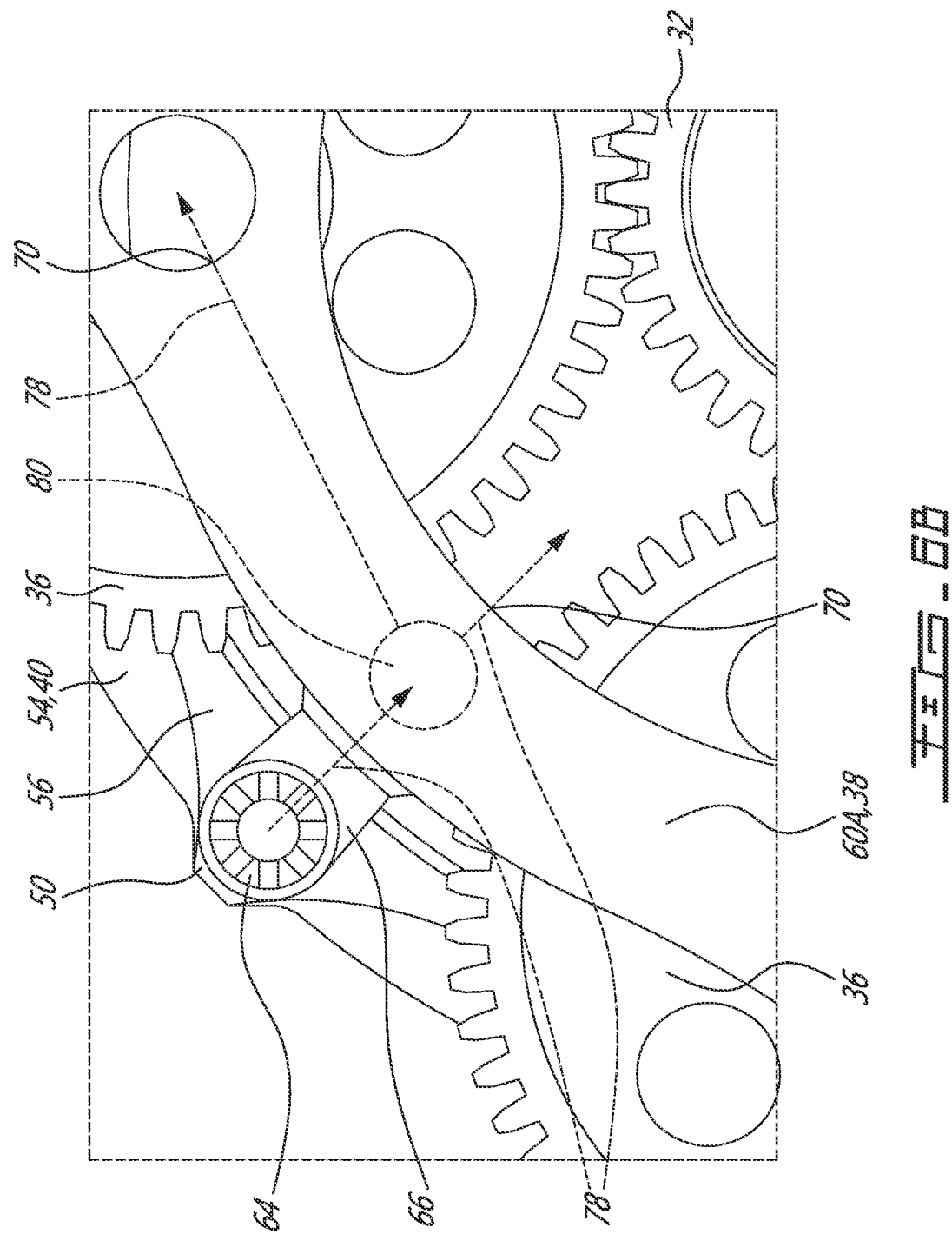
FIG. 6B is an enlarged front view of part of the epicyclic gear train of FIG. 2 schematically showing lubricant passages through the carrier.

FIG. 6B is an enlarged front view of part of gear train 12 schematically showing lubricant passages 78 defined inside of carrier 38. Lubricant passages 78 may be internal to components of carrier 38. In some embodiments lubricant passages 78 may be drilled into or otherwise have a unitary construction with components of carrier 38. Lubricant passages 78 may provide fluid communication from bolt 64 to one or more destinations within gear train 12. In some embodiments, carrier 38 may include manifold 80 defined within an arm 62 (shown in FIG. 7). Manifold 80 may serve to distribute lubricant to a plurality of lubricant passages 78. In some embodiments, one or more lubricant passages 78 may convey lubricant to one or more bearings rotatably supporting intermediate gears 36 of gear train 12. In some embodiments, one or more lubricant passages 78 may convey lubricant to teeth of intermediate gears 36, of sun gear 32, and/or of ring gear 34, to lubricate and cool the meshing of gears for example. Some lubricant passages 78 may lead to lubricant outlets 70 shown in FIGS. 4A and 4B.

FIG. 7 is a cross-section view of part of carrier 38 and torque frame 40 of taken along line 7-7 in FIG. 6A. Line 7-7 extends through a connection between torque frame 40 and carrier 38. The connection provides both a structural connection and a fluid connection between torque frame 40 and carrier 38. In some embodiments, the connections between torque frame 40 and carrier 38 may all have substantially identical configurations. Bolt 64 may extend through bracket 66 and be threaded into a threaded portion of socket 50 to securely attach carrier 38 to torque frame 40. Bolt 64 may also be inserted through sleeve 68 providing a shear load interface between bolt 64 and socket 50. Torque frame 40 may include one or more lubricant passages 82 defined therein. Lubricant passage 82 may be in fluid communication with a source of liquid lubricant of a lubrication system of engine 10 or from another system of an aircraft to which engine 10 is mounted. Lubricant passage 82 may be internal to socket 50 of torque frame 40 and may extend through torque frame 40. In some embodiments lubricant passage 82 may be drilled into or otherwise have a unitary construction with torque frame 40.

Bolt 64 may be hollow and define lubricant passage 84 extending therethrough. When the connection between carrier 38 and torque frame 40 is established via bolt 64, lubricant passage(s) 78 of carrier 38 may be in fluid communication with lubricant passage 84 of bolt 64, and lubricant passage(s) 84 of bolt 64 may in turn be in fluid communication with lubricant passage(s) 82 of torque frame 40. Accordingly, torque frame 40, carrier 38 and bolt 64 may cooperatively define an internal lubricant passage extending through the connection and supplying lubricant to at least one of intermediate gears 36 and/or to other components of gear train 12.

Manifold 80 may include a chamber drilled into arm 62 and then capped with threaded plug 86. Lubricant passages 78 may also be drilled and optionally capped if/where needed. Manifold 80 may include one or more inlets and a plurality of outlets leading to lubricant passages 78 for delivering lubricant to different destinations within gear train 12.

FIG. 8 is a flow diagram of a method 100 of operating an epicycllic gear train. Method 100 may be performed using gear train 12 or another gear train. Other actions disclosed herein may be incorporated into method 100. Elements of gear train 12 may also be incorporated into method 100. In various embodiments, method 100 may include:

transferring rotational power between sun gear 32 and ring gear 34 of epicyclic gear train 12 via intermediate gears 36 of epicyclic gear train 12 (block 102);

preventing intermediate gears 36 from revolving relative to sun gear 32 by using torque frame 42 interacting with both carrier 38 of epicyclic gear train 12 and structure 42 of engine 10 (block 104); and supplying lubricant (e.g., from a system associated with an aircraft) to part of epicyclic gear train 12 via torque frame 40 and carrier 38 (block 106).

As explained above, the connection between carrier 38 and torque frame 40 may combine both structural and fluid communication interfaces/functions. The connection may include bolt 64 which may be hollow. Bolt 64 may have lubricant passage 84 establishing fluid communication between lubricant passage 82 of torque frame 40 and lubricant passage 78 of carrier 38.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A star-configured epicyclic gear train of an aircraft powerplant, the star-configured epicyclic gear train comprising:
   a sun gear having a rotation axis;
   a ring gear;
   a plurality of intermediate gears circumscribed by the ring gear, and being meshed with the sun gear and with the ring gear;
   a carrier supporting the intermediate gears; and
   a torque frame attaching the carrier to a stationary structure of the aircraft powerplant to prevent rotation of the carrier and of the intermediate gears about the rotation axis of the sun gear, the torque frame engaging the carrier at a connection, the torque frame and the carrier cooperatively defining a lubricant passage extending through the connection and extending to a lubricant outlet directed toward at least one of the intermediate gears.

2. The star-configured epicyclic gear train as defined in claim 1, wherein:
   the connection includes a bolt attaching the carrier to the torque frame; and
   the bolt includes an internal passage defining part of the lubricant passage.

3. The star-configured epicyclic gear train as defined in claim 2, wherein the bolt extends along a bolt axis that is parallel to the rotation axis of the sun gear.

4. The star-configured epicyclic gear train as defined in claim 1, wherein the torque frame has an annular overall shape defining a bore for interfacing with a shoulder defined on the stationary structure to locate the torque frame relative to the stationary structure.

5. The star-configured epicyclic gear train as defined in claim 4, wherein the torque frame includes a flange with a plurality of holes formed therethrough for attaching the torque frame to the stationary structure of the aircraft powerplant using a plurality of fasteners.

6. The star-configured epicyclic gear train as defined in claim 5, comprising a rib extending at least partially around the bore, the flange extending radially outward from the rib.

7. The star-configured epicyclic gear train as defined in claim 5, wherein the flange is located radially inward of the ring gear relative to the rotation axis of the sun gear.

8. The star-configured epicyclic gear train as defined in claim 1, wherein the carrier includes:
   a first carrier frame disposed to a first axial side of the plurality of intermediate gears;
   a second carrier frame disposed to a second axial side of the plurality of intermediate gears opposite the first axial side; and
   a plurality of arms interconnecting the first carrier frame and the second carrier frame, each arm including an internal passage defining part of the lubricant passage; and
   a plurality of brackets, each bracket extending radially outward from a respective one of the arms, the carrier being attached to the torque frame via the brackets.

9. The star-configured epicyclic gear train as defined in claim 8, wherein:
   the connection is one of a plurality of connections;
   at least one of the plurality of connections includes a hollow bolt engaged with one of the brackets and with a socket of the torque frame; and
   the lubricant passage extends through the hollow bolt.

10. The star-configured epicyclic gear train as defined in claim 9, wherein the hollow bolt extends along a bolt axis that is parallel to the rotation axis of the sun gear.

11. An aircraft powerplant comprising:
a source of rotational power;
a bladed rotor; and
an epicyclic gear train drivingly coupling the source of rotational power to the bladed rotor, the epicyclic gear train including:
an input gear for receiving the rotational power from the source of rotational power, the input gear having a rotation axis;
an output gear drivingly coupled to the bladed rotor;
an intermediate gear drivingly coupling the input gear to the output gear;
a carrier supporting the intermediate gear; and
a torque frame attaching the carrier to a structure of the aircraft powerplant to prevent rotation of the carrier and of the intermediate gear about the rotation axis of the input gear, the torque frame being attached to the carrier at a connection, the torque frame and the carrier cooperatively defining a lubricant passage extending through the connection for supplying lubricant to the epicyclic gear train.

12. The aircraft powerplant as defined in claim 11, wherein the lubricant passage includes:
a first passage defined by the torque frame and extending through the torque frame;
a second passage extending through a bolt located at the connection, the second passage being in fluid communication with the first passage; and
a third passage defined by the carrier and extending through the carrier, the third passage being in fluid communication with the second passage.

13. The aircraft powerplant as defined in claim 12, wherein the bolt extends along a bolt axis that is parallel to the rotation axis of the input gear.

14. The aircraft powerplant as defined in claim 11, wherein:
the torque frame has an annular overall shape defining a bore interfacing with a shoulder defined on the structure to locate the torque frame relative to the structure; and
the bore is coaxial with the rotation axis of the input gear.

15. The aircraft powerplant as defined in claim 14, comprising a rib extending at least partially around the bore, a radially inner side of the rib defining at least part of the bore.

16. The aircraft powerplant as defined in claim 15, wherein:
the torque frame includes a flange with a plurality of holes formed therethrough;
the torque frame is attached to the structure of the aircraft powerplant with fasteners respectively extending through the holes formed in the flange; and
the flange is located radially outward of the rib.

17. The aircraft powerplant as defined in claim 11, wherein:
the intermediate gear is one of a plurality of in intermediate gears drivingly coupling the input gear to the output gear;
the output gear is a ring gear circumscribing the plurality of intermediate gears;
the carrier includes:
a first carrier frame disposed on a first axial side of the plurality of intermediate gears;
a second carrier frame disposed on a second axial side of the plurality of intermediate gears opposite the first axial sides;
an arm interconnecting the first carrier frame and the second carrier frame, the arm being located radially inward of the ring gear, the arm including an internal passage defining part of the lubricant passage; and
a bracket extending radially outward from the arm, the carrier being attached to the torque frame via the bracket.

18. A method of operating an epicyclic gear train associated with an aircraft powerplant, the method comprising:
transferring rotational power between a sun gear and a ring gear of the epicyclic gear train via intermediate gears of the epicyclic gear train;
preventing the intermediate gears from revolving relative to the sun gear by using a torque frame interacting with both a carrier of the epicyclic gear train and a structure of the aircraft powerplant; and
supplying lubricant to part of the epicyclic gear train through a connection between the torque frame and the carrier.

19. The method as defined in claim 18, wherein the supplying the lubricant to the part of the epicyclic gear train includes conveying the lubricant through a passage extending through the carrier and the torque frame via the connection between the carrier and the torque frame.

20. The method as defined in claim 18, wherein:
the torque frame is attached to the structure of the aircraft powerplant via a plurality of fasteners;
the fasteners are located radially inward of the ring gear;
the torque frame includes a rib extending at least partially around a rotation axis of the sun gear; and
the fasteners are located radially outward of the rib.

* * * * *